Patented Dec. 12, 1922.

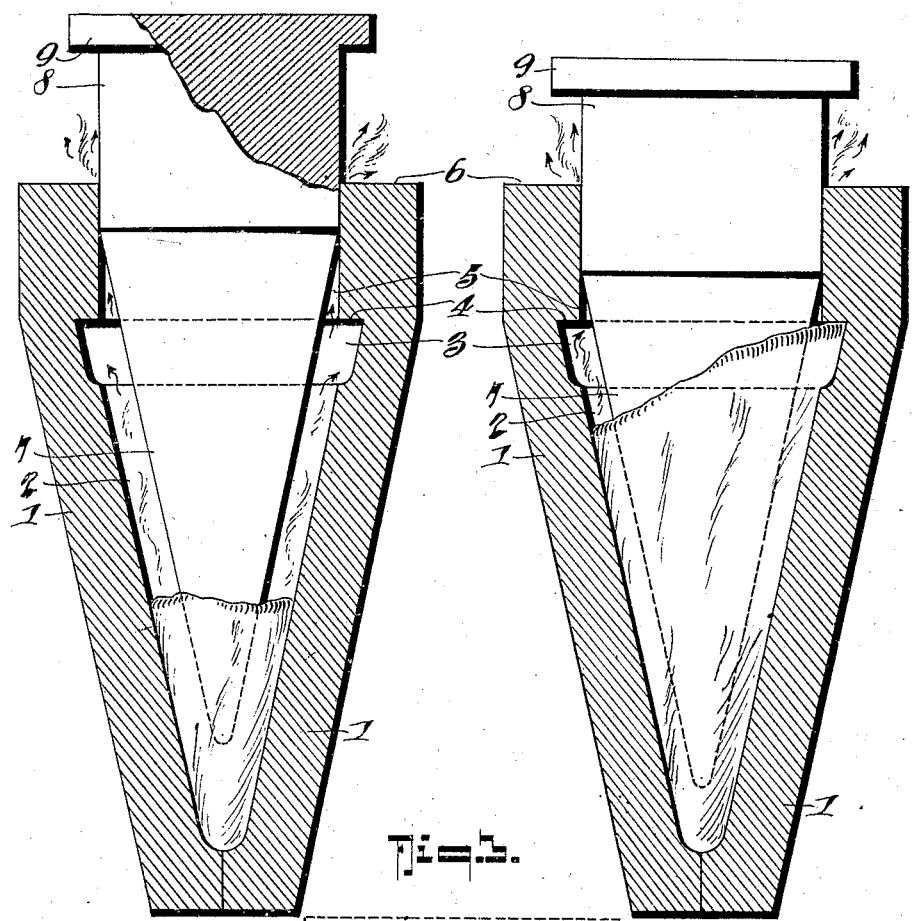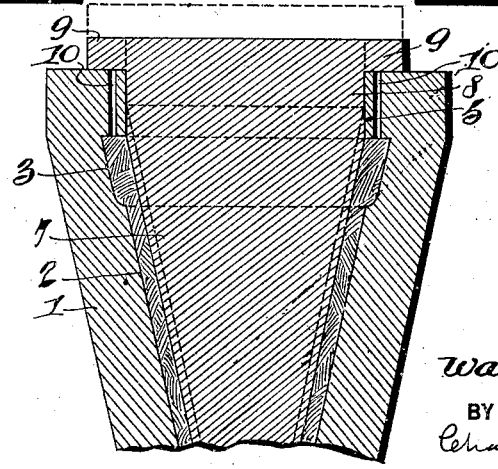

1,438,541

UNITED STATES PATENT OFFICE.

WALTER McLAREN, OF DAYTON, OHIO, ASSIGNOR TO ALEXANDER McLAREN, OF DAYTON, OHIO.

METHOD OF MAKING CUP PASTRY.

Application filed October 6, 1919. Serial No. 328,655.

*To all whom it may concern:*

Be it known that I, WALTER McLAREN, a citizen of the United States, residing at Dayton, in the county of Montgomery and State of Ohio, have invented a new and Improved Method of Making Cup Pastry, of which the following is a specification.

My invention relates to the art of cup pastry manufacture in which it is the practice to mold and bake the articles in male and female element baking molds, either by use of hand operated devices, or by the use of automatic machines.

In the art as heretofore practiced, the construction and manipulation of the molds has been such that an excess of batter above the amount required to form a perfect cone, must usually be present in order that all cavities of the mold unit may make full cones. This practice has resulted in great waste of material, ranging from 20 to 40 per cent, depending upon the apparatus employed and the skill of the operator. It is therefore one of the objects of my invention to provide a method of manipulating the mold elements, so that this waste may be practically eliminated and perfect cones made without their being required to be trimmed, thereby obtaining a greater number of perfect cones from a given quantity of flour than has heretofore been possible when employing the methods in vogue prior to my invention.

A further object of my invention is to provide a method whereby the batter may be worked down and finally compressed within a compartment of uniform volume (regardless of the usual variations in the quantity of batter delivered to the mold cavity) thus enabling the production of a product of exact dimensions or size with smooth edges and of any desired shape or design.

In carrying out my invention, I preferably employ molds of the usual male and female types (either solid bed, for making paste cones, or split molds, for making sugar cones) preferably providing the mold with a throat, and providing the core with a neck, the latter being designed to fit the throat at the mouth of the female part, before the core is forced home, thus closing the cavity, upon the partial insertion of the core, against escape of the batter and yet allowing for the more or less free escape of steam, and enabling the core to be reciprocated, (raised and lowered) to work the batter to fill the entire mold cavity and on the final seating of the core compress the batter to its final form and size.

The method which I employ and which constitutes the present invention, involves spreading the batter in the mold cavity by using the core in a peculiar way and closing the mold against the egress of the batter while allowing the steam to escape until finally the batter is worked into its last shape and size at the time the core is seated or forced to its final position in the mold cavity; the working of the core in and out (up and down) is done in such manner that the batter is spread over the entire baking surfaces of the mold and core, the batter being kneaded, as it were, in a confined space, and the core caused to approach its final position by a succession of teetering movements, reaching its final position by the time the steam has practically all escaped and imparting to the mass the final compacting pressure.

The accompanying drawing illustrates certain forms of split molds with which my method may be carried out, reference being had to the drawing by which it will be seen that—

Figure 1 is a vertical section of a baking mold unit of the type employing a split female mold element, the batter charge having been introduced and the core partly inserted, the mouth of the mold being closed against the escape of batter.

Figure 2 is a view similar to Figure 1, showing the intermediate position of the core.

Figure 3 is a detail view similar to Figures 1 and 2, of a modification and showing the core in its final position after the steam has escaped and the batter has been compressed to the size and shape desired.

In the drawings, in which like numerals and letters of reference indicate like parts in all of the figures, 1 represents the female mold of the split mold type. Molds of this type are usually provided with a plurality of cavities adapted to be opened by a separation of the molds along the central plane. In the drawing but a single cavity is shown for purposes of illustration. The molding cavity usually comprises a coniform portion 2 which forms the body of the cone and a recessed portion 3 which forms the head of the cone. The molding cavity is located a suitable distance below the top face 6 of the mold and a throat 5 is formed in the mold which communicates with the molding cavity and forms a shoulder 4 where the throat 5 meets the upper end of the molding cavity. 7 designates a core which is provided with a neck 8 designed to enter the throat 5 and fit the same with a working fit, i. e., such a fit as will permit the escape of steam while not permitting the escape of batter between the surfaces. The core 7 is carried by a head 9 which overlies the neck 8 and is adapted, when the core is fully seated, to rest in engagement with the top face 6 of the mold (see Figure 3) thereby determining the final position of the core in the mold. In addition to allowing the steam to escape between the surfaces of the throat 5 and neck 8, the mold may be provided with suitably located vents 10, preferably of such cross-sectional area, however, as not to permit the escape of the batter so as always to maintain a pressure within the molding cavity. In the practical application of the invention, the batter is placed in the mold cavity in the usual way, the core being removed from the mold. After the batter has been placed in the cavity, the core is introduced into the same and causes the batter to spread upwardly in the mold cavity (see Figure 2). As the neck 8 fits the throat 5 with a working fit, the steam will escape between the engaging surfaces of these parts but the batter cannot escape and hence is confined within the cavity of the mold. The core is then further projected into the cavity, either by a continual downward gradual movement or by a succession of reciprocating or teetering movements gradually approaching the final seating of the core. This results in the alternate increasing and decreasing of the pressure within the mold cavity to work the batter into all of the recesses of the cavity. The operation of reciprocating the core as it is being seated is conducted such number of times as may be found desirable in practice until the escape of steam has practically subsided, at which time the batter will then fill the molding cavity and become practically evenly distributed at the mouth of the same, the shoulder 4 acting as a baffle for the rising batter and assisting in its distribution. The final movement of the core to bring it to its fully seated position (see Figure 3) results in a final compression of the mass, and the elimination of blow-holes. If the batter in swelling, fills up one side of the molding cavity more than at another place and works into the throat 5 it will be forced down out of the throat into the molding cavity on the final movement of the core.

While the above described manner of manipulating the core is the preferable one, it is obvious that other manipulations of the parts may be effected to obtain the desired result as, for instance, instead of reciprocating the core it may be forced to its final seated position by a preferably continuous uniform gradual pressure, either applied mechanically, or through the weight of the core bar and core, which may be made heavy enough to perform this function.

Should the amount of batter fed into the mold cavity be slightly less than the exact amount required, the batter will be swelled up by the steam action and the reciprocating movements of the core until it fills the cavity. If a slight excess of batter is employed, the batter will be compressed within the mold cavity. In the first place, a slightly lighter cone is produced than in the latter case, but in both instances the final size and shape of the cone will be the same.

It will be observed that an essential feature of my present invention resides in confining the material worked upon, in a closed chamber, the area of which is then decreased, and pressure applied to compact the mass of the article into a definitely defined size and shape.

Where the core is seated with a uni-directional continuous motion, the vents 10 may be employed to allow a somewhat more rapid escape of steam during the initial part of the operation before the batter reaches the shoulder 4 and thus close the vents 10, thereby enabling the core to be seated somewhat more rapidly than would otherwise be the case.

The drawing illustrates one embodiment of apparatus which may be used in carrying out my invention but I do not wish to be understood that the invention is limited thereto as changes in the details of construction may be made to suit the particular machine in which the invention is to be employed.

It is also understood that the particular way of introducing the batter to the mold is not material as any of the means of standard practice may be employed as, for instance, pouring the batter charge into the cavity from a can, by hand, squirting or pouring it in by pumping devices, or dipping the core into the batter and then inserting the core into the mold cavity, all of which means of introducing batter are well-known in practice.

In this application I make no claim, per se, to the apparatus employed as that constitutes the subject matter of an application which is a continuation in part of this application, filed on December 31, 1919, Serial No. 348655.

From the foregoing description, taken in connection with the accompanying drawings, it is thought the invention will be readily understood by those skilled in the art.

What I claim is:

1. The method of making cup pastry in male and female baking molds having a molding cavity open at but one place, which consists in introducing a quantity of batter to the mold, introducing the core partially into the female mold cavity and closing the female mold cavity against the escape of batter while providing for the escape of steam and subsequently moving the core to a constant final position in the mold cavity, allowing the batter to bake until the article has become finished, and then separating the male and female members of the mold and removing the article therefrom.

2. The method of manufacturing cup pastry in male and female baking molds having a molding cavity open at but one place, which consists in introducing a quantity of batter to the mold, then partly introducing the core into the mold cavity and simultaneously closing the entrance of the mold cavity against the escape of batter while permitting escape of steam, gradually projecting the core further into the mold cavity to distribute the batter and subsequently moving the core to a constant final position in the mold cavity at approximately the time the escape of steam ceases, and allowing the batter to bake until the article has finished and then separating the male and female members of the mold and removing the article therefrom.

3. The method of manufacturing cup pastry in male and female baking molds having a molding cavity open at but one place, which consists in introducing a quantity of batter to the mold, then partially introducing the core into the female mold cavity, closing off the mouth of the female mold cavity against the escape of batter while permitting escape of steam and directing the batter at the mouth of the cavity evenly, then forcing the core to a constant final position at approximately the time the escape of steam has ceased, allowing the batter to bake until the article is finished and then separating the male and female members of the mold and removing the article therefrom.

4. The method of manufacturing cup pastry in male and female baking molds having a molding cavity open at but one place, which consists in introducing a measured quantity of batter to the mold, partly inserting the core into the female mold and simultaneously plugging the entrance of the female mold cavity to restrain the swelling batter and cause it to effect an even distribution as the core is being pressed home, allowing the baking and swelling operation to continue and the steam generated to escape from the mold, then moving the core to a constant finally seated position and completing the baking operation and subsequently removing the article from the mold.

5. The method of making cup pastry in male and female baking molds having a molding cavity open at but one place, which consists in introducing a quantity of batter to the mold, introducing the core partially into the female mold cavity and closing the mouth of the cavity against the escape of batter while permitting escape of steam, imparting a teetering movement to the core gradually tending to seat the core during the interval of the escape of steam and finally moving the core to its seated position, allowing the batter to bake until the article has become finished and then separating the male and female members of the mold and removing the article therefrom.

6. The method of making cup pastry in male and female baking molds having a molding cavity open at but one place, which consists in introducing a quantity of batter to the mold, projecting the core partly into the female mold cavity and into the batter to begin the distribution of the batter, closing the mouth of the female mold cavity against escape of the batter before the batter rises thereto and before the core is fully seated, imparting a reciprocating motion to the core while forcing the core toward its seated position and allowing the escape of steam from the mold cavity while restraining the batter therein, finally moving the core into the cavity to its seated position and allowing the batter to bake until the article has become finished, and then separating the male and female members of the mold and removing the article therefrom.

7. The method of making cup pastry consisting in introducing batter to the baking mold, partially introducing the core into the mold cavity and simultaneously closing the mold cavity against the escape of batter while permitting the escape of steam, imparting a reciprocating motion to the core while gradually moving it toward its finally seated position, to alternately stop and again permit the escape of steam until the steam has approximately all escaped and then moving the core to its finally seated position, allowing the batter to remain in the mold until the article has become finished and then removing the article from the mold.

8. The method of manufacturing cup pastry, in male and female baking molds which consists in introducing the batter to the female mold cavity, then partially inserting the core into the cavity to effect a distribution of the batter, closing off the female mold cavity against the escape of batter while permitting the free escape of steam, then forcing the core to its final seated position and cutting off the free escape of steam, allowing the material to remain in the mold until the same has become baked and then removing the contents from the mold.

9. The method of making cup pastry in male and female baking molds, which consists in introducing a quantity of batter to the female mold cavity, introducing the core into the female mold cavity to effect a distribution of the batter and closing the female mold cavity against the escape of batter while permitting the free escape of steam, subsequently moving the core to its final position in the mold cavity and closing off the mold cavity against the free escape of steam and allowing the batter to bake until the article has become finished and then separating the male and female members of the mold and removing the article therefrom.

10. The method of making cup pastry consisting in introducing batter to the baking mold, introducing the core into the mold cavity to effect a distribution of batter and simultaneously closing the mold cavity against the escape of batter while permitting the free escape of steam, imparting a reciprocating motion to the core while gradually moving it toward its finally seated position until the steam has approximately escaped and then moving the core to its finally seated position, allowing the batter to remain in the mold until the article has become finished and then removing the article from the mold.

11. The method of making cup pastry, consisting in introducing batter to the baking mold, introducing the core into the mold cavity to effect a distribution of the batter and simultaneously closing the mold cavity against the escape of batter while permitting the escape of steam, imparting a reciprocating motion to the core while gradually moving it toward its finally seated position until the steam has approximately all escaped and then moving the core to its finally seated position and compressing the material in the mold cavity and allowing the batter to remain in the mold until the article has become finished and then removing the article from the mold.

12. The method of manufacturing cup pastry in male and female baking molds which consists in introducing batter to the mold, then inserting the core into the cavity of the mold to effect a distribution of batter, closing the female mold cavity against escape of batter while permitting the free escape of steam, then forcing the core to its final seated position and cutting off the free escape of steam, allowing the material to remain in the mold until the same has become baked and then removing the contents from the mold.

13. The method of making cup pastry in male and female baking molds which consists in introducing batter to the mold, inserting the core into the female mold cavity in a manner which will distribute the batter to the extent desired and closing the female mold cavity against the escape of batter while allowing for escape of steam, applying gradual pressure to the core to force it toward its final seated position, allowing the while for the escape of steam and then, when the steam has approximately all escaped, forcing the core to a constant final seated position and compressing the batter to the form desired.

14. The method of making cup pastry in male and female baking molds which consists in introducing batter to the mold, inserting the core into the female mold cavity in a manner to distribute the batter to the extent desired and closing the female mold against escape of batter while allowing for the escape of steam, applying yielding pressure to the core to force it toward its final seated position, allowing the while for the escape of steam and then forcing the core to its final seated position compressing the batter to the form desired.

15. The method of making cup pastry in male and female baking molds which consists in applying batter to the mold, inserting the core into the female mold and closing the mold against the escape of batter, forcing the core toward its fully seated position to thoroughly distribute the batter through the molding cavity, then allowing the core to raise, then applying pressure to force the core to its finally seated position, compressing the baking batter to the shape and size desired.

16. The method of manufacturing cup pastry which consists in confining a charge of batter in a fluid-tight chamber of greater volume than the volume of the batter charge to which chamber heat is applied to cook the batter, alternately decreasing and increasing the volume of said chamber while gradually reducing the volume to the final capacity and form desired, thereby working the batter and molding it into its final shape and volume.

17. The method of manufacturing pastry which consists in confining a charge of batter in a substantially liquid tight baking chamber of greater volume than the volume of the batter charge to which chamber heat is applied to cook the batter, alternately decreasing and increasing the volume of said chamber while gradually reducing the volume to the final capacity and form desired.

thereby working the batter and molding it into its final shape and volume.

18. The method of making cup pastry in male and female baking molds which consists in introducing batter to the mold, inserting the male mold into the female mold cavity in a manner to distribute the batter to the extent desired and closing the female mold against escape of batter while allowing for the escape of steam, applying yielding pressure to the male mold to force it toward its final seating position, allowing the while for the escape of steam and then forcing the male mold to its final seated position compressing the batter to the form desired.

19. The method of making cup pastry in a male and female baking mold, which consists in introducing the batter to the mold, inserting the male element into the female element of the mold, closing the mold against escape of batter while permitting the escape of steam, applying yielding pressure to the mass in the mold, while allowing the steam to escape and finally pressing the mass to the form and size desired.

20. The method of making cup patsry in male and female baking molds, which consists in introducing a quantity of batter into the female mold cavity, introducing the male mold partially into the female mold cavity and closing the mouth of the female mold cavity against the free escape of batter while permitting the free escape of steam, subsequently moving the male mold to its final position in the mold cavity, and closing off the mold cavity against the free escape of steam and allowing the batter to bake until the article has become finished and then separating the male and female members of the mold and removing the article therefrom.

21. The method of making cup pastry consisting in introducing batter into the baking molds, partially introducing the core into the mold cavity and simultaneously closing the entrance of the mold cavity against the free escape of batter while permitting the free escape of steam, imparting a reciprocating motion to the core while gradually moving it toward its finally seated position to alternately stop and again permit the free escape of steam until the steam has approximately all escaped and then moving the core to its finally seated position, allowing the batter to remain in the mold until the article has become finished and then removing the article from the mold.

22. The method of making cup pastry consisting in introducing batter into the baking molds, partially introducing the core into the mold cavity and simultaneously closing the entrance of the mold cavity against the free escape of batter while permitting the free escape of steam, imparting a reciprocating motion to the core while gradually moving it toward its finally seated position to alternately stop and again permit the free escape of steam until the steam has approximately all escaped and then moving the core to its finally seated position while permitting the restricted escape of residual steam and compressing the material in the mold cavity, and allowing the batter to remain in the mold until the article has become finished and then removing the article from the mold.

23. The method of manufacturing cup pastry, in male and female baking molds which consists in introducing the batter into the female mold cavity, then partially inserting the male mold into the cavity to effect a distribution of the batter, closing off the mouth of the female mold cavity against the escape of batter while permitting the free escape of steam, then forcing the male mold to its final seated position and cutting off the free escape of steam, allowing the material to remain in the mold until the same has become baked and then removing the contents from the mold.

24. The method of making cup pastry in male and female baking molds, which consists in introducing a quantity of batter into the female mold cavity, introducing the male mold into the female mold cavity to effect a distribution of the batter and closing the mouth of the female mold cavity against the escape of batter while permitting the free escape of steam, subsequently moving the male mold to its final position in the mold cavity and closing off the mold cavity against the free escape of steam and allowing the batter to bake until the article has become finished and then separating the male and female members of the mold and removing the article therefrom.

25. The method of making cup pastry consisting in introducing batter into the baking molds, introducing the core into the mold cavity to effect a distribution of batter and simultaneously closing the entrance of the mold cavity against the escape of batter while permitting the free escape of steam, imparting a reciprocating motion to the core while gradually moving it toward its finally seated position until the steam has approximately all escaped and then moving the core to its finally seated position, allowing the batter to remain in the mold until the article has become finished and then removing the article from the molds.

26. The method of making cup pastry, consisting in introducing batter into the baking molds, introducing the core into the mold cavity to effect a distribution of the batter and simultaneously closing the entrance of the mold cavity against the escape of batter while permitting the free escape of steam, imparting a reciprocating motion to the core while gradually moving it toward its finally seated position until the steam has approximately all escaped and then moving the core to its finally seated position.

27. The method of manufacturing cup pastry in male and female baking molds which consists in introducing batter into the female mold cavity, then inserting the male mold into the cavity to effect a distribution of batter, closing the mouth of the female mold cavity against escape of batter while permitting the free escape of steam, then forcing the male mold to its final seated position and cutting off the free escape of steam, allowing the material to remain in the mold until the same has become baked and then removing the contents from the mold.

WALTER McLAREN.